United States Patent [19]

Berkowitz et al.

[11] Patent Number: 4,606,030
[45] Date of Patent: Aug. 12, 1986

[54] VACUUM ULTRAVIOLET LASER

[75] Inventors: Joseph Berkowitz, Hinsdale, Ill.; Branko M. Ruscic, Zagreb, Yugoslavia; John P. Greene, Woodridge, Ill.

[73] Assignee: The United States of America as represented by the United States Department of Energy, Washington, D.C.

[21] Appl. No.: 628,700

[22] Filed: Jul. 6, 1984

[51] Int. Cl.[4] .................................................. H01S 3/30
[52] U.S. Cl. ........................................ 372/5; 372/23; 372/70; 372/82; 372/89; 372/55; 372/34
[58] Field of Search ......................... 372/55, 34, 69, 82, 372/5, 39, 89, 85, 23

[56] References Cited

U.S. PATENT DOCUMENTS

| | | | |
|---|---|---|---|
| 3,959,741 | 5/1976 | Meinzer | 372/89 |
| 3,982,208 | 9/1976 | Camac | 372/89 |
| 3,987,372 | 10/1976 | Ehrlich et al. | 372/89 |
| 4,517,676 | 5/1985 | Meinzer et al. | 372/68 |

Primary Examiner—Leon Scott, Jr.
Attorney, Agent, or Firm—Michael J. Higgins; Jeannette M. Walder; Judson R. Hightower

[57] ABSTRACT

Transitions from the $2p^4(^1S_0)3s\ ^2S_{\frac{1}{2}}$ state of atomic fluorine to all allowed lower states produces laser emission at six new wavelengths: 680.7 Å, 682.6 Å, 3592.7 Å, 3574.1 Å, 6089.2 Å, and 6046.8 Å. Coherent radiation at these new wavelengths can be generated in an atomic fluorine laser operated as an amplifier or as an oscillator.

9 Claims, 4 Drawing Figures 4,606,030

VACUUM ULTRAVIOLET LASER

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to gas lasers, and more particularly to an atomic fluorine laser operating in the vacuum ultraviolet region.

Many gases, both molecular and atomic, can absorb energy which raises their electrons to an excited state. The excited state has a tendency to return to the lowest or ground state. When an electron in an excited state returns to a lower or ground state, energy in the form of electromagnetic radiation is given up. This radiation has a wavelength corresponding to the difference between the two energy levels involved. The wavelength of the electromagnetic radiation emitted is described by the relationship $$\lambda = \frac{hc}{\Delta E}$$

where $\lambda$ is the wavelength of the emitted radiation, h is Planck's constant, c is the speed of light, and $\Delta E$ is the difference in energy between the upper and lower energy levels. Not all wavelengths emitted for a given gas can be used for a laser. Only those excited states where population inversion occurs result in lasing action.

The arc spectrum of atomic fluorine has been investigated for many years. While many lines and energy levels have been identified for atomic fluorine, this is not sufficient to determine which, if any, transitions between energy levels result in lasing action.

Certain transitions in atomic fluorine have been demonstrated to be useful lasers in the visible region of the spectrum. U.S. Pat. No. 3,676,797 to Kovacs describes an atomic fluorine laser producing a visible beam of laser energy at 7039 Å, 7129 Å, and 7204 Å. Kovacs uses a mixture of a fluorine containing gas and helium in a resonant optical cavity. A pulsed electric discharge across the gas mixture dissociates the fluorine-containing gas and generates sufficient fluorine atoms in an excited state to produce a population inversion. A visible output at 7039 Å to 7204 Å is obtained by adjusting the mirrors of the optical resonant cavity.

U.S. Pat. No. 3,882,414 to Jeffers et al. also describes an atomic fluorine laser producing a visible beam of energy at 7037.45 Å, 7127.88 Å, and 7800.22 Å. The Jeffers laser differs from the Kovacs laser in the manner in which the fluorine atoms are excited. The Jeffers laser is a dissociative transfer laser. The gaseous mixture consists of helium, hydrogen fluoride, and molecular hydrogen. An electric discharge excites the helium atoms into a metastable state; collisions with the hydrogen fluoride molecules then result in the formation of atomic fluorine in an excited state to produce a population inversion. The Jeffers laser is also operated as an oscillator, using an optical resonator cavity.

More recently, Sadighi-Bonabi et al., J. App. Phys. 53(5), May 1982, described laser output in an atomic fluorine laser at 745 and 635 nm (7450 Å and 6350 Å), both of which are in the visible range. Sadighi-Bonabi et al. achieve their lasing effect by ion-ion recombination of $He^+$ and $F^-$.

The foregoing atomic fluorine lasers are to be distinguished from the well known excimer lasers. In an excimer laser, such as the one described in U.S. Pat. No. 4,177,435 to Brown, the lasing medium consists of a rare gas and a halide. The rare gas and halide form a temporary molecule, such as ArF, which is excited to create a population inversion, which produces a laser output at wavelengths completely different from those of the individual constituent gases.

While lasers operating in the visible range are useful, they have less energy than those operating in the ultraviolet and vacuum ultraviolet regions. From equation (1) it can be seen that as $\Delta E$ increases, $\lambda$ decreases. A laser operating in the vacuum ultraviolet region has a significantly greater energy than one operating in the visible or infrared region.

Therefore, it is an object of the present invention to provide an atomic fluorine laser operating in the vacuum ultraviolet region of the spectrum.

It is also an object of the present invention to provide an atomic fluorine laser operating at heretofore unknown wavelengths.

The foregoing and other objects, features, and advantages of the present invention will become more apparent in light of the following description and accompanying drawings.

BRIEF DESCRIPTION OF THE DRAWINGS

The present invention is illustrated in the accompanying drawings wherein.

SUMMARY OF THE INVENTION

Figure 1:
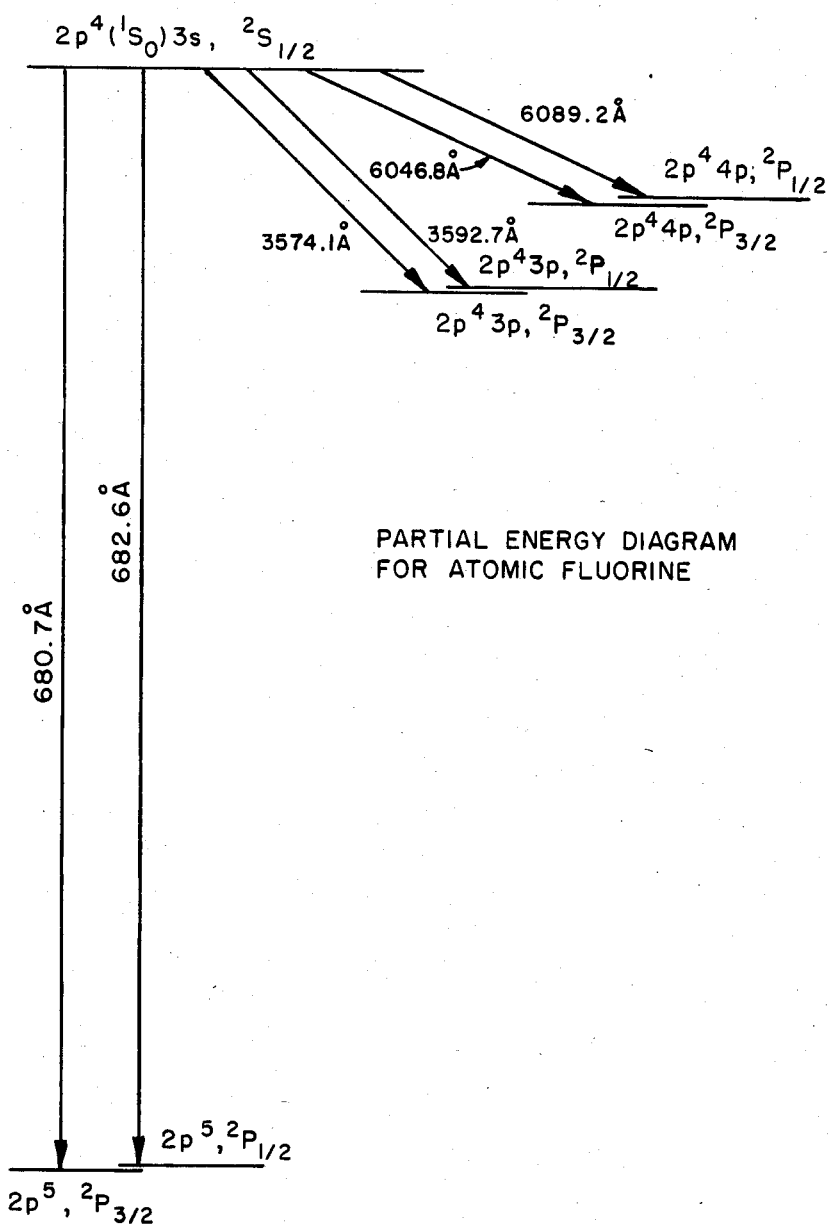
FIG. 1 is a partial energy level diagram for atomic fluorine.

The present invention is the first observation and demonstration of laser emission from the $2p^4({}^1S_o)3s$ $^2S_{1/2}$ state of atomic fluorine. Transitions from this state to all allowed lower states result in laser emission at six new wavelengths: 680.7 Å and 682.6 Å in the vacuum ultraviolet region, 3592.7 Å and 3574.1 Å in the ultraviolet region, and 6089.2 Å and 6046.8 Å in the visible region (see FIG. 1). Coherent radiation at these new wavelengths can be generated in an atomic fluorine laser operated as an oscillator or as an amplifier. An atomic fluorine laser lasing at the aforementioned wavelengths may also be obtained by applying an electrical discharge such as a microwave discharge through a chamber containing a fast-flowing mixture of a dilute fluorine containing gas in a carrier gas such as helium.

The microwave discharge produces excited species, which may be ions or neutral particles. Among these species is the excited $2p^4({}^1S_o)3s$ $^2S_{1/2}$ state of atomic fluorine to which we attribute lasing action. However, if it were only created in the microwave discharge, it would decay in $10^{-8}$–$10^{-9}$ sec. The atom would only travel $10^{-7}$ cm in the flow tube during this short time. However, the emission from this excited state is observed some several centimeters beyond the microwave discharge. Therefore, the excited state of fluorine atom under discussion, $2p^4(^1S_o)3s\ ^2S_{1/2}$, must be continually formed by the reaction of excited species generated in the microwave discharge, which individually survive much longer than $10^{-8}$–$10^{-9}$ sec - in fact, must survive for 0.1-1 seconds. This output beam is present so long as the gas is flowing and the microwave discharge is applied.

Greater laser output is achieved if the chamber is replaced by an optical resonator cavity. However, since wavelengths in the VUV region are absorbed by current state-of-the-art mirrors used in such cavities, the chamber will only effectively resonate the visible and ultraviolet wavelengths. The laser system is also effectively operated as a laser amplifier by directing a light source at one or more of the six wavelengths into the chamber.

DETAILED DESCRIPTION OF THE INVENTION

Figure 2:
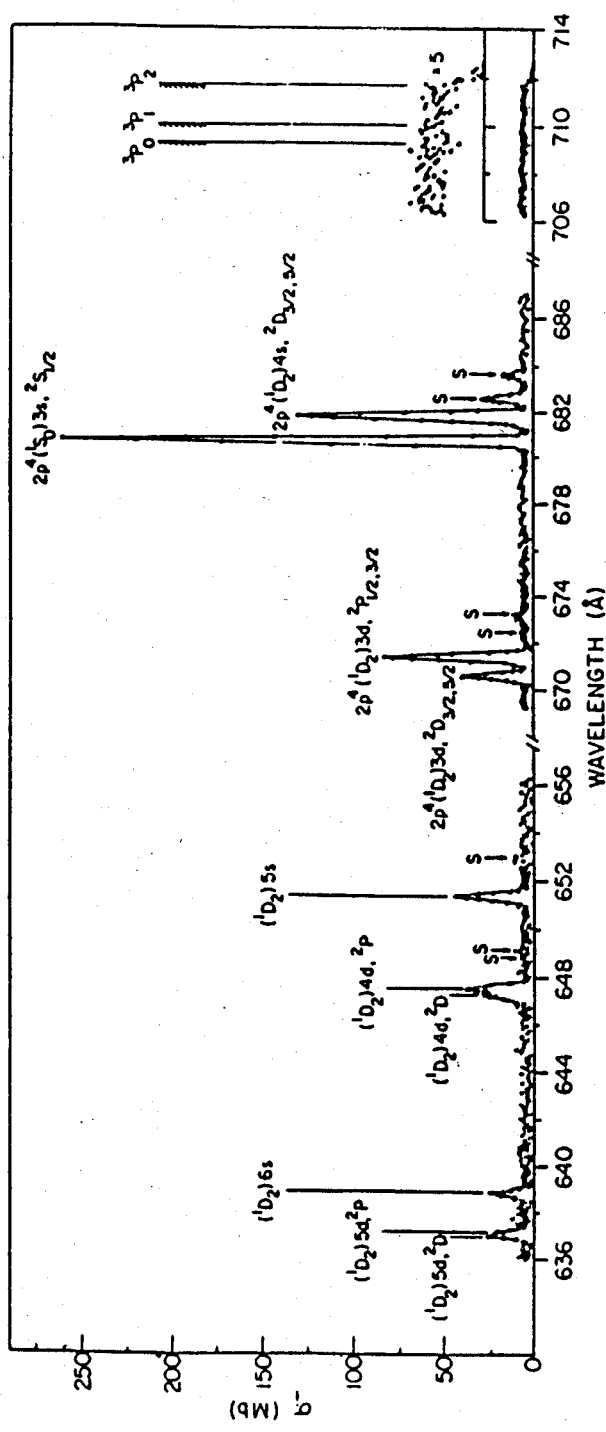
FIG. 2 is a partial photoionization spectrum for atomic fluorine.

The partial photoionization spectrum of atomic fluorine is shown in FIG. 2. The largest peak at 680.7 Å and its spin orbit partner at 682.6 Å are observed in emission but not in absorption, indicating that spontaneous or stimulated emission from the $2p^4(^1S_o)3s\ ^2S_{1/2}$ state has been occurring in the absorption experiment.

Figure 3:
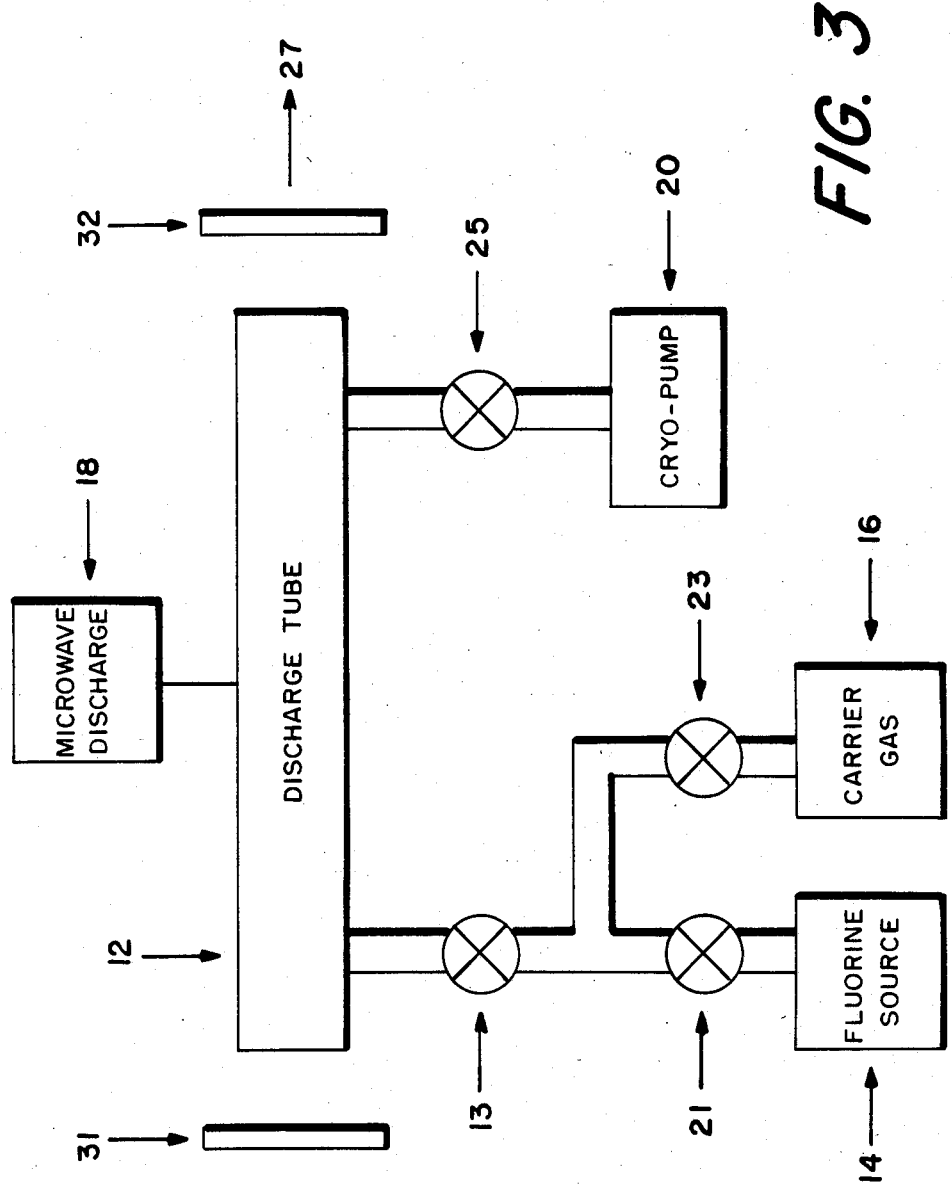
FIG. 3 is a schematic diagram of a laser system in an oscillator configuration in accordance with the present invention.

In FIG. 3, sealed discharge tube 12 contains a mixture of lasing gas and a carrier gas. A fluorine containing gas such as $SF_6$ or $F_2$ is provided from source 14 through valve 21. A carrier gas such as helium is provided from source 16 through valve 23. The gas mixture is then allowed to flow into tube 12 through a variable leak valve 13, which controls the flow. The gas then exits the tube through valve 25 into the cryo-pump 20. Microwave discharge source 18 provides the energy to dissociate the fluorine containing gas to provide atomic fluorine and to excite some of the fluorine atoms to the $2p^4(^1S_o)3s\ ^2S_{1/2}$ lasing state from which they emit coherent radiation at one or more of the six wavelengths: 680.7 Å, 682.6 Å, 3592.7 Å, 3574.1 Å, 6089.2 Å, and 6046.8 Å. The discharge tube is approximately 20 in. in length and 5/16 in. in bore. The interior of the discharge tube is coated with a haloform wax to prevent recombination. Preferably, the ratio of fluorine containing gas to helium is approximately 5%. The pressure of the flowing gases is from 0.1 to 1 torr and the frequency of the microwave discharge in the range of 2.45 GHz.

An excited fluorine atom has two ways of returning to the ground state: by emitting a photon (radiative emission) or by emitting an electron (auto ionization). It has been found that the radiative lifetime for an excited fluorine atom in the excited state $[2p^4(^1S_o)3s\ ^2S_{1/2}]$ is of the order of $10^{-9}$ seconds and that the mean life for auto ionization is of the order of $3\times10^{-10}$ seconds. When population inversion has been achieved, the triggering for lasing action can occur by spontaneous emission or by an external source of one of these six wavelengths. As long as the gas mixture is flowing through the discharge tube and the microwave discharge is applied, the output beam 27 will contain coherent radiation at 680.7 Å, 682.6 Å, 3592.7 Å, 3574.1 Å, 6089.2 Å, and 6046.8 Å.

In order to obtain greater power output at the visible and UV wavelengths, discharge tube 12 is operated as an optical resonator cavity in FIG. 3 with the addition of mirrors 31 and 32. Mirrors 31 and 32 are adjusted to sustain oscillations at one or more of the wavelengths: 6089.2 Å, 6046.8 Å, 3592.7 Å, and 3574.1 Å.

Figure 4:
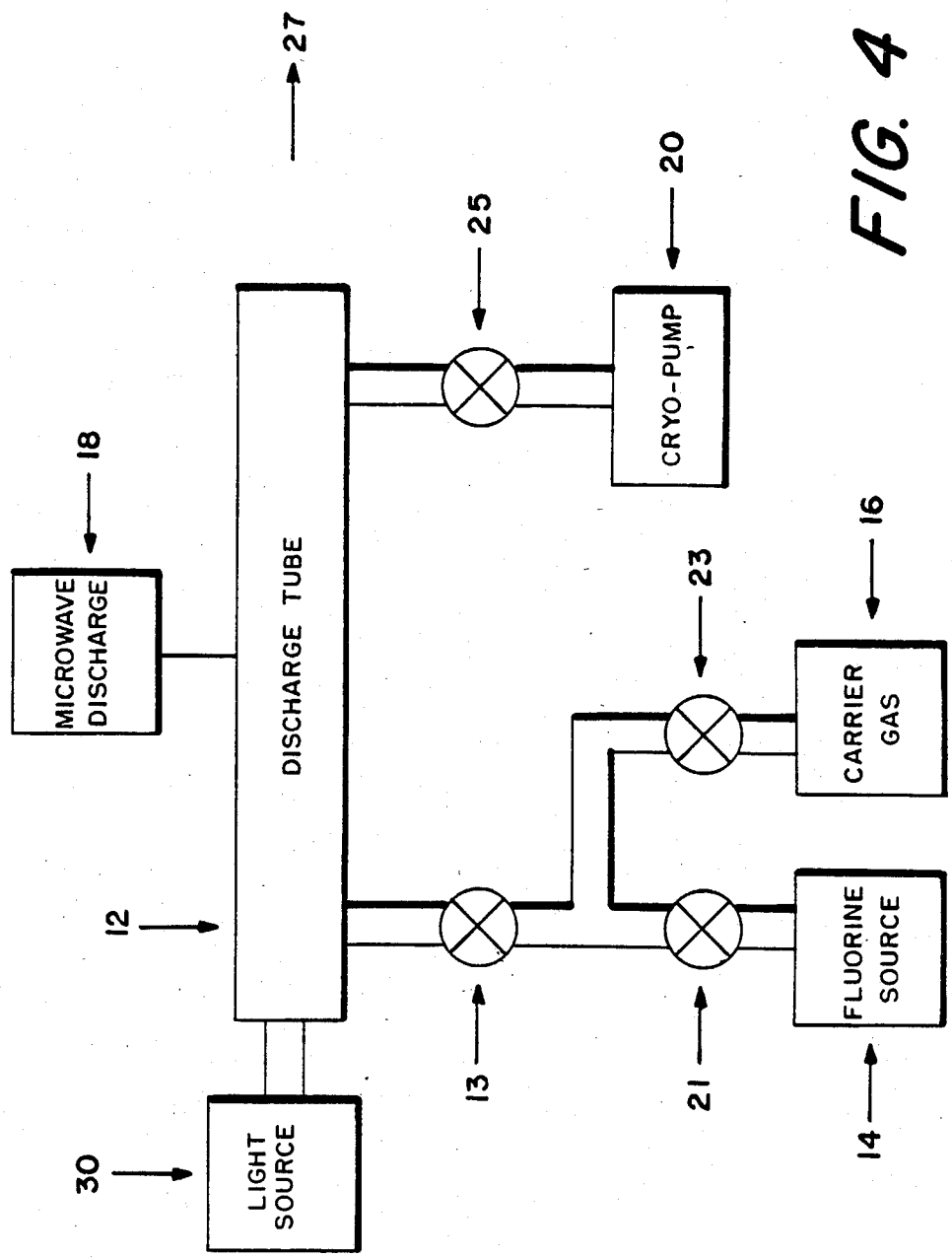
FIG. 4 is a schematic diagram of a laser system in an amplifier configuration in accordance with the present invention.

FIG. 4 is a schematic diagram of a laser system in an amplifier configuration. In this configuration, a light source 30 is provided to stimulate radiation at one or more of the six wavelengths. The rest of the system is the same as that of FIG. 3 (like numbers corresponding to like parts) except that discharge tube 12 is not operated as an optical resonator.

Various light sources may be used. In the visible and near UV light range, many sources are available such as high pressure mercury or xenon arc lamps. For the VUV range more exotic sources are required. Although not an efficient source of VUV radiation, the Hopfield helium continuum could be used. Perhaps the most efficient source of radiation at the six wavelengths of the present invention would be a fluorine discharge. For this light source dilute fluorine would be flowed into a discharge tube. Only an electric discharge sufficient to provide light at the requisite wavelengths but not to sustain population inversion would be required.

Clearly, the amplifier arrangement of FIG. 4 could be modified to include mirrors to resonate the UV and visible wavelengths. Also, it should be understood that numerous modifications can be made to the above-described embodiments without departing from the scope of this invention.

The embodiments of this invention which an exclusive property or privilege is claimed are defined as follows:

1. An atomic fluorine laser amplifier comprising:
   a chamber;
   a fluorine containing gas flowing in said chamber;
   electric discharge means to dissociate said gas to provide a population inversion of fluorine atoms in an exited state; and
   means for directing incident radiation at one or more wavelengths selected from the group consisting of 6089.2 Å, 6046.8 Å, 3592.7 Å, 3574.1 Å, 680.7 Å and 682.6 Å through said chamber to produce amplified spontaneous stimulated emission from said excited fluorine atoms at corresponding wavelengths.

2. The laser of claim 1 further comprising a diluent carrier gas of helium in said chamber.

3. The laser of claim 2 wherein the ratio of fluorine containing gas to helium is approximately 5% and the pressure of said flowing gases is from 0.1 to 1.0 torr.

4. The laser of claim 3 wherein said discharge comprises a microwave discharge operating at a frequency in the range of 2.45 GHz.

5. The laser of claim 4 wherein said fluorine containing gas is $SF_6$.

6. The laser of claim 4 wherein said fluorine containing gas is $F_2$.

7. The laser of claim 1 wherein said means for directing incident light comprises a fluorine discharge.

8. An atomic fluorine laser comprising:
   an optical resonator cavity capable of sustaining oscillations at one or more wavelengths of 6089.2 Å, 6046.8 Å, 3592.7 Å and 3574.1 Å,
   a fluorine containing gas flowing in said cavity;
   microwave discharge means to dissociate said gas to provide a population inversion of fluorine atoms in an excited state; and means for abstracting an output beam from said resonant cavity.

9. The laser of claim 8 further comprising a diluent carrier gas of helium in said cavity.

* * * * *